(12) United States Patent
Obara et al.

(10) Patent No.: US 10,063,911 B1
(45) Date of Patent: Aug. 28, 2018

(54) METHODS AND SYSTEMS FOR RE-INTEGRATING A PIP CATCH-UP WINDOW WITH LIVE VIDEO

(71) Applicant: Rovi Guides, Inc., San Carlos, CA (US)

(72) Inventors: Takeaki Obara, Tokyo (JP); Mario Sanchez, San Jose, CA (US); Phillip Teich, Pasadena, CA (US); Carla Mack, Los Angeles, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/807,759

(22) Filed: Nov. 9, 2017

(51) Int. Cl.
| | |
|---|---|
| *H04N 21/4147* | (2011.01) |
| *H04N 21/431* | (2011.01) |
| *H04N 21/432* | (2011.01) |
| *H04N 21/433* | (2011.01) |
| *H04N 21/4402* | (2011.01) |
| *H04N 21/472* | (2011.01) |
| *H04N 21/4223* | (2011.01) |

(52) U.S. Cl.
CPC ..... *H04N 21/4333* (2013.01); *H04N 21/4223* (2013.01); *H04N 21/47217* (2013.01)

(58) Field of Classification Search
CPC .......... H04N 21/4147; H04N 21/4316; H04N 21/4325; H04N 21/4334; H04N 21/440281

USPC .................................. 725/10, 151; 348/565
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,681,165 B1 | 6/2017 | Gupta et al. | |
| 2002/0174430 A1 | 11/2002 | Ellis et al. | |
| 2005/0251827 A1 | 11/2005 | Ellis et al. | |
| 2006/0109380 A1* | 5/2006 | Salomons | H04N 5/45 348/565 |
| 2010/0153885 A1 | 6/2010 | Yates | |
| 2017/0332036 A1 | 11/2017 | Panchaksharaiah et al. | |
| 2017/0332125 A1 | 11/2017 | Panchaksharaiah et al. | |

* cited by examiner

*Primary Examiner* — Dominic D Saltarelli
(74) *Attorney, Agent, or Firm* — Haley Guiliano LLP

(57) ABSTRACT

Methods and systems are disclosed herein for automatically recording and generating for display a catch-up video in a PIP window. If a user viewing a media program on a user equipment is detected to be distracted, the user equipment automatically begins recording the program. When the user is detected to no longer be distracted, the user equipment begins to display the recorded catch-up video in a PIP window. The playback rate of the catch-up video may be faster than the rate of the live video to allow the user to catch up quickly. The playback rate and size of the PIP window may be varied depending on the duration, remaining duration, and content of the catch-up video.

20 Claims, 10 Drawing Sheets

METHODS AND SYSTEMS FOR RE-INTEGRATING A PIP CATCH-UP WINDOW WITH LIVE VIDEO

BACKGROUND

Media programs, especially live broadcast programs such as sporting events, are not always of predictable length, or may not be broadcast during times when a user is guaranteed to be able to watch uninterrupted. Additionally, a number of users may be watching together and may cause interruptions by engaging in conversations or other activities which cause a user to miss a portion of the program. Such interruptions are often not anticipated and users are often not prepared to record the program during broadcast, resulting in an inability to review portions of the program that were missed. Currently available systems enabling recording of programs. However, it is not convenient to interrupt viewing for a group of people if one person needs to review a missed portion.

SUMMARY

Therefore, methods and systems are disclosed herein for generating for display a catch-up video (e.g., a segment of a media program recorded during the time a user was detected as being distracted) in a picture-in-picture ("PIP") window, and re-integrating the PIP window with the live program. Display of the catch-up window is configured to provide a catch-up viewing experience that does not diminish a user's ability to understand the missed portion of the media asset.

In some aspects, a media guidance application may be configured for generating the catch-up display. The media guidance application may reside on a multimedia device (e.g., a set-top box). The media guidance application may determine that a plurality of users is viewing a media asset. The device, e.g., a set-top box, that the media guidance application resides on may include, for example, a camera or another sensor module to detect and track users while the users view media programs. The media guidance application may determine that a user of the plurality of users is distracted. For example, a set-top box on which the media guidance application resides, may detect, e.g., via a camera or another sensor module, that a user is distracted from viewing the media asset by, for example, recording and analyzing the position and orientation of each user's head. In some embodiments, the media guidance application may transmit the recording to a remote server for analysis and receive a response indicating if any users are distracted.

In response to determining that a user is distracted, the media guidance application may begin recording the media asset. For example, the set-top box may include a recording module that is able to store camera images. The media guidance application may use the same methods for determining if a user is distracted to determine if that user is no longer distracted. For example, the media guidance application may detect that a user has turned his/her head towards the device it resides on. When the user is determined to no longer be distracted, the media guidance application may generate for simultaneous display with the live video the recorded segment of the media asset in a PIP window to allow the user to view the portion of the media asset the user missed. For example, the media guidance application may have recorded five minutes of a two-hour long media asset.

The media guidance application may play back the recorded segment at a playback rate faster than a rate at which the live video is playing back. For example, the media guidance application may play back the media asset at 1× and the recorded segment at 1.2× or 1.5×, or another suitable speed. The faster play speed enables the media guidance application to catch-up with the live point of the media asset.

During playback, the media guidance application may periodically monitor the relative progress of the catch-up video. If the relative progress does not exceed a certain threshold, the media guidance application may reduce the size of the PIP window based on the relative progress. For example, if the relative progress is fifty percent, the PIP window may be reduced to half of its original size. As another example, the PIP window may be reduced to a size that is halfway between its original size and a minimum size. If the relative progress does exceed the threshold, then the media guidance application may discontinue generating the PIP window for display. For example, the threshold may be ninety-five percent. When the relative progress exceeds ninety-five percent, the media guidance application may discontinue generating the PIP window for display. The threshold value may be determined by the media guidance application based on, for example, the overall length of the catch-up video. The media guidance application may determine the threshold value to be at or near one hundred percent if the catch-up video is of a short duration, such as five minutes. For longer catch-up videos, for example, catch-up videos exceeding fifteen minutes in length, the media guidance application may determine a threshold value to be between ninety and ninety-five percent.

In some embodiments, the media guidance application may determine the relative progress based on the current playback position of the catch-up video. For example, the media guidance application may identify a first current playback position of the catch-up video in the PIP window, and a second current playback position of the live video. The media guidance application may compare the first and second playback positions to compute the relative progress of the catch-up video. As another example, the media guidance application may determine the current playback position of the catch-up video relative to the total length thereof. As another example, the media guidance application may determine the remaining duration of the catch-up video.

In some embodiments, the media guidance application may send the audio corresponding to the catch-up video to a mobile device associated with the user. For example, the media guidance application may search for a mobile device associated with the user in, for example, in a database of user devices, or in a user profile. The media guidance application may send the audio corresponding to the catch-up video to the mobile device while the audio corresponding to the live video continues to be output at the device from where the video is being played.

In some embodiments, the media guidance application may vary the playback rate of the catch-up video and size of the PIP window based on the content of segment of the catch-up video being played back. For example, the media guidance application may determine an initial playback rate by measuring an amount of time from when the user was determined to be distracted to that when the user was determined to no longer be distracted. If the measured amount of time is less than a threshold time (e.g., thirty minutes), the playback rate may be set in proportion with the measured time. For example, if the measured amount of time is five minutes, the media guidance application may set the initial playback rate at 1.2×, only slightly faster than the normal playback rate, due to the short length of time the user was distracted. If, however, the measured time is fifteen minutes, the media guidance application may set the initial playback rate at 2×, twice the normal speed, so as to decrease the time required to catch up to the live video.

The media guidance application may analyze the content being presented in the PIP window. For example, the media guidance application may search a database of importance levels of media content segments (e.g., scenes of a media asset) to determine an importance level of the segment of the missed content currently being played back. The media guidance application may change the size of the PIP window in proportion to the importance level of the content of the segment. For example, a very important scene in a movie may trigger the media guidance application to temporarily increase the size of the PIP window while the important scene is played back. If the importance level exceeds a first importance threshold, the media guidance application may decrease the playback rate of the catch-up video to allow for better viewing of the scene. For example, the plurality of users may be watching the movie "Star Wars." A catch-up video is initiated for one user who was distracted, comprising the scenes in which Luke Skywalker and Obi-Wan Kenobi travel to a bar where they meet Han Solo. The importance level of the content of the traveling scenes may be determined to be low, while the importance level of the scene comprising the meeting may be determined to be high. While playing back the catch-up video, the media guidance application may temporarily increase the size of the PIP window during the meeting scene. If the importance level exceeds a second importance threshold, the media guidance application may set the playback rate of the catch-up video to normal (i.e., the playback rate of the live video), and pause the live video.

The media guidance application may also determine if dialogue is present in the segment that is currently being played back. If no dialogue is present, the media guidance application may temporarily increase the playback rate of the catch-up video. If dialogue is present, the media guidance application may temporarily decrease the playback rate of the catch-up video. For example, in playing back the exemplary catch-up video described above, the media guidance application may increase the playback rate of the catch-up video during the traveling scenes. However, at some points of the traveling scene, such as when Luke Skywalker and Obi-Wan Kenobi pause on a cliff to view their destination, there is some dialogue. The media guidance application may detect the presence of the dialogue and temporarily decrease the playback rate of the catch-up video to at least a rate at which the dialogue is intelligible, and at most a rate equal to the live playback rate.

If the initial playback rate is set to a value greater than a maximum playback rate threshold, then the media guidance application may discontinue generating for display the PIP window. In response to this, or in response to the measured amount of time exceeding the threshold, the media guidance application may search for a mobile device associated with the user and send a textual summary of the catch-up video to the user's mobile device.

In some embodiments, the media guidance application may detect certain parameters relating to each user to determine if any user is distracted, and if any user determined to be distracted is no longer distracted. For example, the media guidance application may detect, using a camera, the facial orientation of the face of a user. If the user's face is not oriented towards the user equipment, the user may be determined to be distracted. If the user's face is oriented towards the user equipment, the media guidance application may process additional parameters. For example, the media guidance application may determine whether the user is within a detection region associated with the user equipment. If the media guidance application determines that the user is not within the detection region, the media guidance application may determine that the user is distracted. If the media guidance application determines that user is within the detection region, the media guidance application may further analyze, for example, whether the user is engaged with a mobile device. If the user is engaged with a mobile device, the media guidance application may determine that the user is distracted. If the media guidance application determines that user is not engaged with a mobile device, the media guidance application may further detect, for example, whether the user is in conversation with another user. If the user is in conversation with another user, the media guidance application may determine that the user is distracted. If the user is not in conversation with another user, the media guidance application may determine that the user is not distracted. Any of these determinations may be made for a user who has already been determined to be distracted and may be used to determine that such a user is no longer distracted.

In some embodiments, the media guidance application may change the size of the PIP window based on the difference between the playback position of the catch-up video and the playback position of the live video. For example, the media guidance application may retrieve a value indicating the difference between the playback position of the catch-up video and the playback position of the live video. The media guidance application may, for example, search a database of window sizes based on the retrieved value, and retrieve from the database a window size corresponding to that value. The media guidance application may change the size of the PIP window to the retrieved window size.

In some embodiments, in addition to sending the audio corresponding to the catch-up video to a mobile device associated with the user, the media guidance application may optionally send the video of the catch-up video to the mobile device associated with the user. For example, the media guidance application may search for a mobile device associated with the user in, for example, in a database of user devices, or in a user profile. The media guidance application may send the audio corresponding to the catch-up video to the mobile device as well as an option to send to the video of the catch-up video to the mobile device as well. The user may choose the view the catch-up video in the PIP window, or on the mobile device. In this embodiment, the PIP window may not be generated for display. The size of the playback window of the catch-up video on the mobile device may not be altered.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
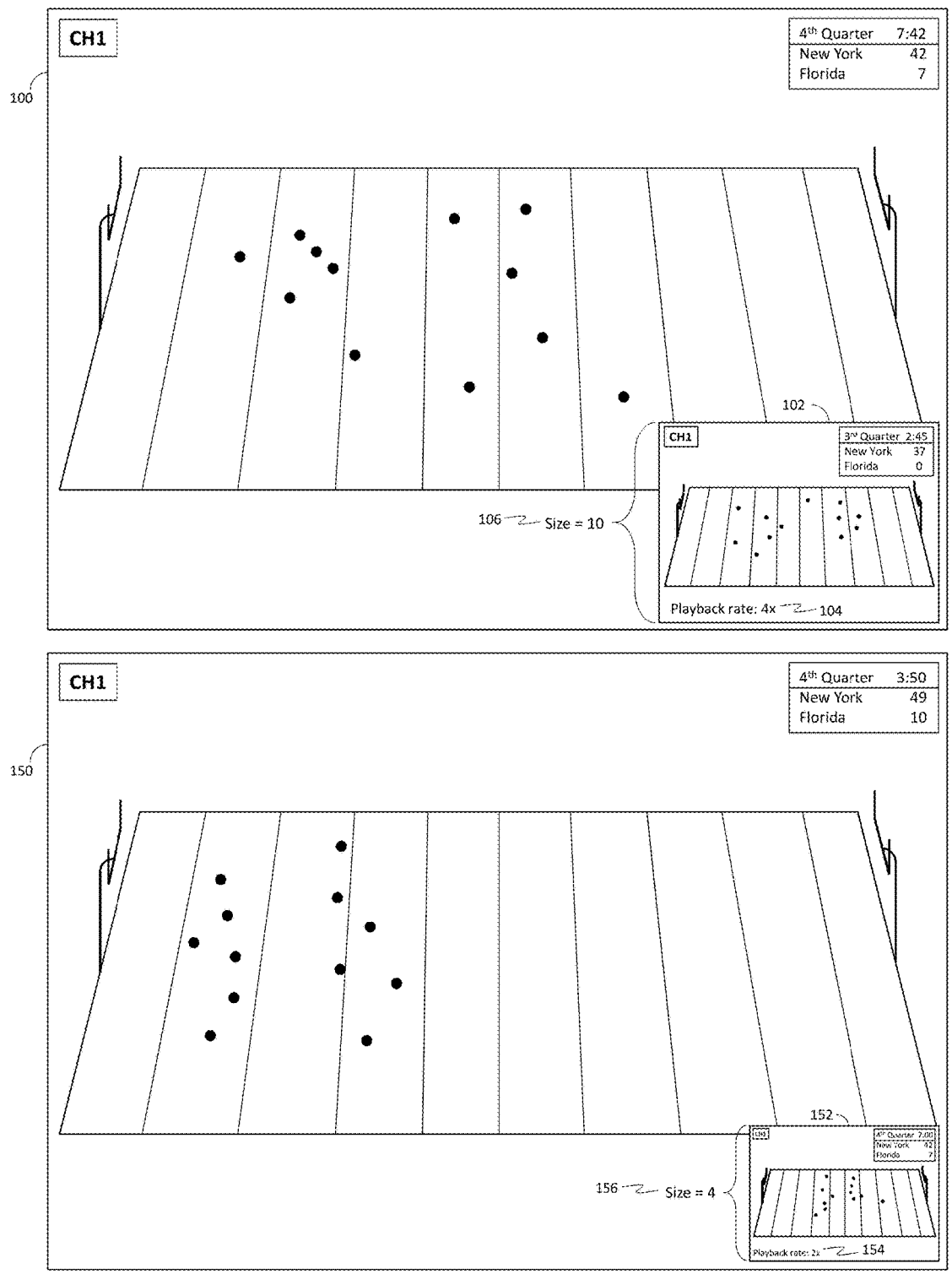
FIG. 1 shows an illustrative display screen including a PIP catch-up window in accordance with some embodiments of the disclosure.

Methods and systems are disclosed herein for generating for display a catch-up video (e.g., a segment of a media program recorded during the time a user was detected as being distracted) in a picture-in-picture ("PIP") window, and re-integrating the PIP window with the live program. Display of the catch-up window is configured to provide a catch-up viewing experience that does not diminish a user's ability to understand the missed portion of the media asset.

In some embodiments, the media guidance application may determine that a plurality of users is viewing a media asset. The media guidance application may, using a camera or other sensor module, may differentiate each individual user by estimating physical parameters such as height, or by using facial recognition. Thus, the user equipment may be able to accurately detect each user, even if the users change their position relative to each other or to the user equipment at a time when the user equipment is not actively detecting each user. The camera or sensor module may be an integrated component of the user equipment, or may be an external component.

The media guidance application may determine that a user of the plurality of users is distracted. The media guidance application may, using the camera or other sensor module, record images or video of the position of each user and the orientation of each user's head. The recorded images or video may be stored within the camera or sensor module, or within an internal storage device of the user equipment, or within an external storage device connected to either the user equipment or the camera or sensor module. The media guidance application may analyze the recorded images or video by detecting each user, comparing the position and orientation of each user's head to a set of parameters based on each respective user's position relative to the camera or sensor module, and the position of the camera or sensor module relative to a display device connected to the multimedia device. The relative positions of each user's head, the camera or sensor, and the display device may allow the multimedia application to triangulate or otherwise calculate the position to which each user's attention is focused. If a user's attention is not focused on the display device, the user may be determined to be distracted. In some embodiments, the media guidance application may transmit the recorded images or video to a remote server for analysis. The transmission may be accomplished by, for example, a Hyper Text Transport Protocol ("HTTP") POST request to the server, including the images or video, or a link to the locally stored images or video. A response from the server may be received, for example, via an HTTP response, indicating if any users are distracted. In some embodiments, the requests may be encrypted or transmitted and received via a protocol different from HTTP.

In response to determining that a user is distracted, the media guidance application may begin recording the media asset. The media guidance application may begin storing the multimedia signal associated with the live video in a local storage medium. Alternatively, or additionally, the media guidance application may record a starting time in a format recognized by a cloud-based recording platform associated with the user equipment. The media guidance application may transmit the start time, for example using an HTTP POST request, to the cloud-based recording platform to initiate recording of the live video from the start time.

The media guidance application may use the same methods for determining if a user is distracted to determine if that user is no longer distracted. For example, the media guidance application may detect that a user's orientation has changed or the orientation of the user's head has changes to be in a direction of the device playing the media content. When the user is determined to no longer be distracted, the media guidance application may generate for simultaneous display with the live video the recorded segment of the media asset in a PIP window to allow the user to view the portion of the media asset the user missed. For example, the media guidance application may generate PIP Window 102 on display screen 100 of FIG. 1. The media guidance application may access the recorded segment of the multimedia signal from a local storage medium, or may transmit a retrieval request to the could-based recording platform, for example using an HTTP GET request. The media guidance application may process for output to the display device the video component of the recorded segment. The media guidance application may generate for display the video of the recorded segment in the PIP Window 102 at a specific size (e.g., size 106).

The media guidance application may play back the recorded segment at a playback rate faster than a rate at which the live video is playing back. For example, as depicted in FIG. 1 element 104, the playback rate may be 4×. It should be noted that another suitable playback rate may be used, e.g., 1.4×, 1.2×, or another suitable play back rate. The media guidance application may drop certain video frames from the segment, such as P-frames or B-frames in order to achieve the faster play back rate. Faster playback speeds may result in more frames being dropped, while slower playback speed may result in fewer frames being dropped. The faster play speed enables the media guidance application to catch-up with the live point of the media asset.

During playback, the media guidance application may periodically monitor the relative progress of the catch-up video. The media guidance application may record the start time of the catch-up video and compare it with the time associated with the current playback position of the catch-up video. Alternatively, or additionally, the media guidance application may compare the time associated with the current playback position of the catch-up video with the current time. If the relative progress does not exceed a certain threshold, the media guidance application may reduce the size of the PIP window based on the relative progress. The media guidance application may calculate a PIP window size based on the relative progress by multiplying an initial dimension parameter of the PIP window by the relative progress to obtain a scaled dimension parameter. Alternatively, the media guidance application may calculate the different between a maximum dimension parameter and a corresponding minimum dimension parameter of the catch-up window, and multiply the calculated difference by the relative progress to obtain a scaled dimension parameter. As exemplified on display screen 150 of FIG. 1, PIP Windows 152 has display size 156 that is set at size 4. If the relative progress does exceed the threshold, the media guidance application may discontinue generating the PIP window for display, and delete the stored segment from local storage, or transmit a command to the cloud-based recording platform, for example using an HTTP POST request, to delete the recorded segment.

The threshold value may be determined by the media guidance application based on, for example, the overall length of the catch-up video. The media guidance application may determine the threshold value to be at or near one hundred percent if the catch-up video is of a short duration, such as five minutes. For longer catch-up videos, for example, catch-up videos exceeding fifteen minutes in length, the media guidance application may determine a threshold value to be between ninety and ninety-five percent.

In some embodiments, the media guidance application may determine the relative progress based on the current playback position of the catch-up video. The media guidance application may identify a current playback position of the catch-up video in the PIP window, and a current playback position of the live video. The media guidance application may compare the playback positions to compute the relative progress of the catch-up video. Alternatively, the media guidance application may determine the current playback position of the catch-up video relative to the total length thereof. As another example, the media guidance application may determine the remaining duration of the catch-up video.

In some embodiments, the media guidance application may send the audio corresponding to the catch-up video to a mobile device associated with the user. The media guidance application may search for a mobile device associated with the user in, for example, in a database of user devices, or in a user profile. The media guidance application may process the audio components of the recorded segments separately from the video component. Alternatively, or additionally, the media guidance application may transmit a command to the cloud-based recording platform, for example using an HTTP POST request, to transmit the audio components of the segment to the media guidance application separately from the video component. The media guidance application may send the audio corresponding to the catch-up video to the mobile device while the audio corresponding to the live video continues to be output at the device from where the video is being played. Alternatively, or additionally, the audio may be sent from the cloud-based recording platform directly to the user's mobile device using a streaming protocol, such as Apple® HLS, Adobe® HDS, MPEG-DASH, RTSP, RTMP, Microsoft® Smooth Streaming, or any other suitable streaming protocol.

In some embodiments, the media guidance application may vary the playback rate of the catch-up video and size of the PIP window based on the content of segment of the catch-up video being played back. The media guidance application may determine an initial playback rate by measuring an amount of time from when the user was determined to be distracted to that when the user was determined to no longer be distracted. For example, display screen 100 of FIG. 1 illustrates PIP Windows 102 having playback rate 104 corresponding to a 4× play speed (e.g., four times faster than standard play speed. It should be noted that initial play speeds may be different (e.g., 1.2×, 1.4×, or another suitable play speed. The media guidance application may compare the measured amount of time with a threshold value. If the measured amount of time is less than the threshold value, (e.g., thirty minutes), the playback rate may be set in proportion with the measured time. For example, if the measured amount of time is five minutes, the media guidance application may set the initial playback rate only slightly faster than the normal playback rate, dropping only a small number of video frames, due to the short length of time the user was distracted. If, however, the measured time is fifteen minutes, the media guidance application may set the initial playback rate at twice the normal speed, dropping a larger number of frames, so as to decrease the time required to catch up to the live video. As time goes on, the media guidance application may drop the play back speed of the content in PIP Window and set it to 2× as illustrated by speed 154 (FIG. 1).

The media guidance application may analyze the content being presented in the PIP window. The media guidance application may use image recognition to determine the type of content being presented. The media guidance application may search a database of importance levels of media content segments (e.g., scenes of a media asset) to determine an importance level of the segment of the missed content currently being played back. The media guidance application may change the size of the PIP window in proportion to the importance level of the content of the segment. The search results from the database of importance levels may include a PIP window scaling factor for each importance level. A very important scene in a movie may have a scaling factor greater than two, while less important scenes may have scaling factors between two and one. The media guidance application may temporarily change the size of the PIP window a particular scene is played back by multiplying a dimension parameter of the PIP window by the scaling factor to obtain a new dimension parameter. The media guidance application may alter the dimension of the PIP catch-up window to match the new dimension parameter (e.g., as demonstrated by FIG. 1 displays screens 100 and 150).

The media guidance application may compare the importance level of the segment with two threshold values. If the importance level exceeds a first importance threshold value, the media guidance application may decrease the playback rate of the catch-up video to allow for better viewing of the scene, and more understandable audio corresponding to the scene. If the importance level exceeds a second importance threshold value, the media guidance application may set the playback rate of the catch-up video to normal (i.e., the playback rate of the live video), and pause the live video.

The media guidance application may determine if dialogue is present in the segment that is currently being played back. The media guidance application may include an audio recognition module capable of discriminating between spoken dialogue and background sounds, including musical lyrics. The audio recognition module may set a flag or Boolean value to TRUE if dialogue is detected in the segment. If no dialogue is present, i.e., if the flag or Boolean value is FALSE, the media guidance application may temporarily increase the playback rate of the catch-up video. If dialogue is present, i.e., the flag or Boolean value is TRUE, the media guidance application may temporarily decrease the playback rate of the catch-up video. The media guidance application may temporarily decrease the playback rate of the catch-up video to at least a rate at which the dialogue is intelligible, and at most a rate equal to the live playback rate.

If the initial playback rate is set to a value greater than a maximum playback rate threshold, then the media guidance application may discontinue generating for display the PIP window. In response to this, or in response to the measured amount of time exceeding the threshold, the media guidance application may search for a mobile device associated with the user, as described above, and send a textual summary of the catch-up video to the user's mobile device.

In some embodiments, to determine if any user is distracted, the media guidance application may determine whether a user is within a detection region associated with the user equipment. The camera or sensor module may have an inherently limited range. Alternatively, the camera or sensor module may also include a ranging module to determine the distance between each user and the user equipment. If the media guidance application determines that the user is not within the detection region, the media guidance application may determine that the user is distracted.

In some embodiments, to determine if any user is distracted, the media guidance application may analyze whether the user is engaged with a mobile device. The camera or sensor module may include an image recognition module configured to identify mobile devices such as smart phones, and tablets, in addition to detecting facial orientations. Thus, the media guidance application may detect that a user is looking down, and there is a mobile device in the user's hand, or in proximity to the user at position toward which the user's face is oriented.

In some embodiments, to determine if any user is distracted, the media guidance application may detect whether the user is in conversation with another user. The media guidance application may, using the camera or sensor module, detect if a user's face is oriented toward another user. If the camera or sensor module is configured to capture video of the users, the media guidance application may detect movements of the user's mouths to determine if they are conversing with one another.

Any of the above determinations may be made for a user who has already been determined to be distracted and may be used to determine that such a user is no longer distracted.

In some embodiments, the media guidance application may change the size of the PIP window based on the difference between the playback position of the catch-up video and the playback position of the live video. The media guidance application may retrieve a value indicating the difference between the playback position of the catch-up video and the playback position of the live video and search a database of window sizes based on the retrieved value. The media guidance application may retrieve from the database a window size corresponding to that value, and change the size of the PIP window to the retrieved window size.

In some embodiments, in addition to sending the audio corresponding to the catch-up video to a mobile device associated with the user, the media guidance application may optionally send the video of the catch-up video to the mobile device associated with the user. The media guidance application may search for a mobile device associated with the user in, for example, in a database of user devices, or in a user profile. The media guidance application may transmit a query to the mobile device regarding the user's preferred method of viewing the catch-up video. Specifically, the user may be offered the option to view the catch-up video in a PIP window as described above, or on the mobile device associated with the user. In response to a selection by the user to view the catch-up video on the mobile device, the media guidance application may process the audio and video components of the recorded segments. Alternatively, or additionally, the media guidance application may transmit a command to the cloud-based recording platform, for example using an HTTP POST request, to transmit the audio and video components of the segment to the media guidance application separately from the video component. The media guidance application may send the audio and video components of the catch-up video to the mobile device while the live video and corresponding audio continues to be output at the device from where the video is being played. Alternatively, or additionally, the audio and video may be sent from the cloud-based recording platform directly to the user's mobile device using a streaming protocol, such as Apple® HLS, Adobe® HDS, MPEG-DASH, RTSP, RTMP, Microsoft® Smooth Streaming, or any other suitable streaming protocol. In this embodiment, the PIP window may not be generated for display. The size of the playback window of the catch-up video on the mobile device may not be altered.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1 shows exemplary display screens displaying a live video and a catch-up video in a PIP catch-up window. Display screen 100 displays a live video, such as a sporting event. When playback of a catch-up video is initiated, processes for which are described below, a PIP catch-up window 102 may be displayed in an overlay on top of the live video. Preferably, the PIP catch-up window overlay is positioned on display screen 100 so as to obscure the least important area of the display screen (i.e., the center area), such as in a corner. When playback of the catch-up video is first initiated, the PIP catch-up window is displayed at a maximum size. The PIP catch-up window begins at size 106. This size 106 may be a fixed size, or may be a percentage of the total screen area of display screen 100. When playback of the catch-up video begins, the playback speed is set at a specific maximum speed. The catch-up video first plays at playback speed 104. As playback of the catch-up video progresses, both the playback speed and the window size may be altered. After progressing partway through the catch-up video, the size of the PIP catch-up window 152 has been reduced in size to size 156, and the playback speed has been reduced to playback speed 154. Both playback speed and window size may be proportional or relative to the progress of the catch-up video.

Figure 2:
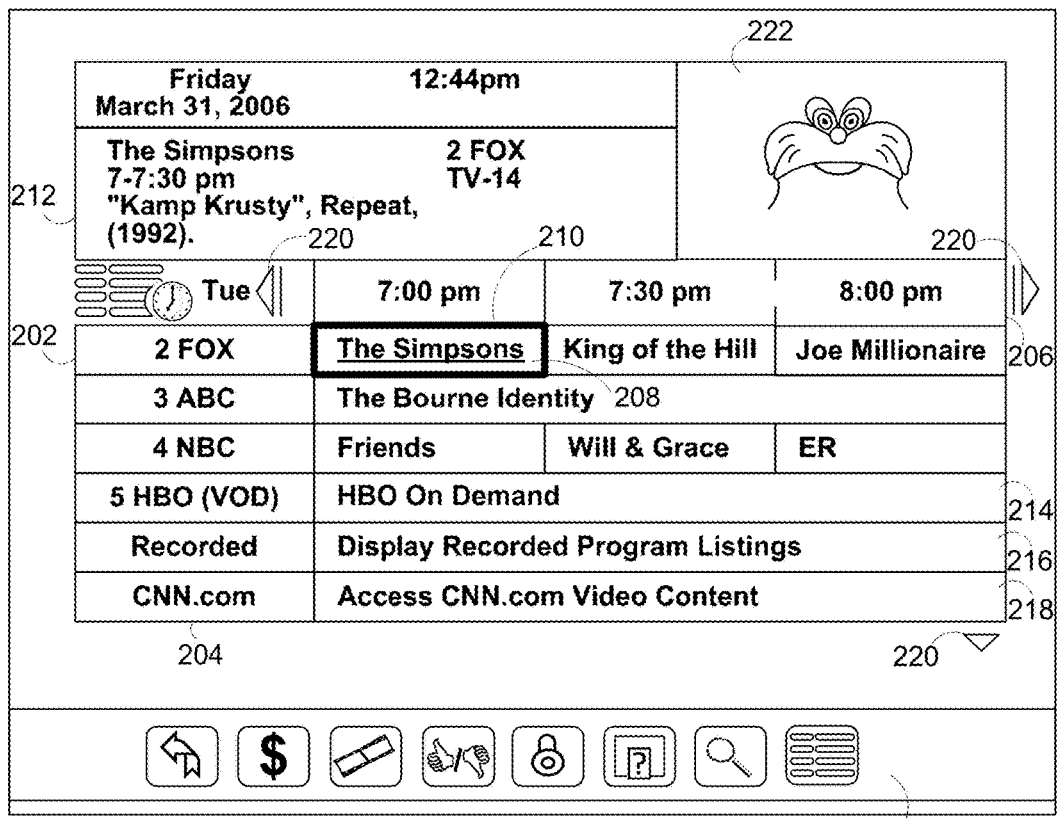
FIG. 2 shows an illustrative display screen that may be used to provide media guidance data in accordance with some embodiments of the disclosure.
Figure 3:
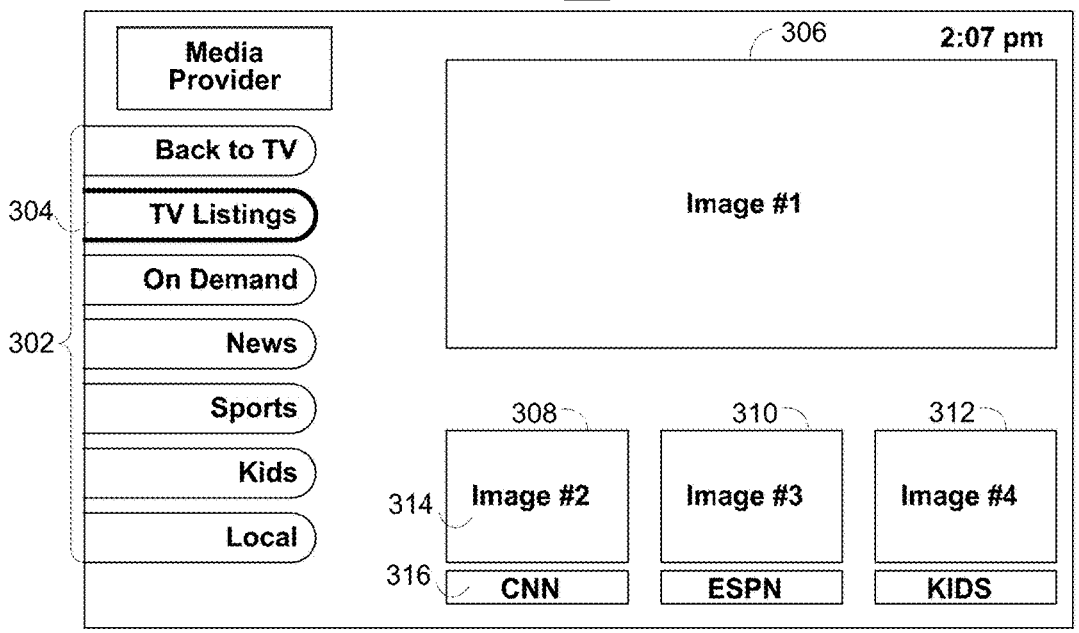
FIG. 3 shows an illustrative display screen that may be used to provide media guidance data in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Some non-linear programming is provided by OTT applications. If an OTT non-linear program is selected from the interactive program guide, a set-top box may instruct a second device to launch the OTT application and access the selected program for output to a display. Other programs may be accessible directly by the set-top box. Such programs may be received by the set-top box and routed through the second device for display.

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No.

2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
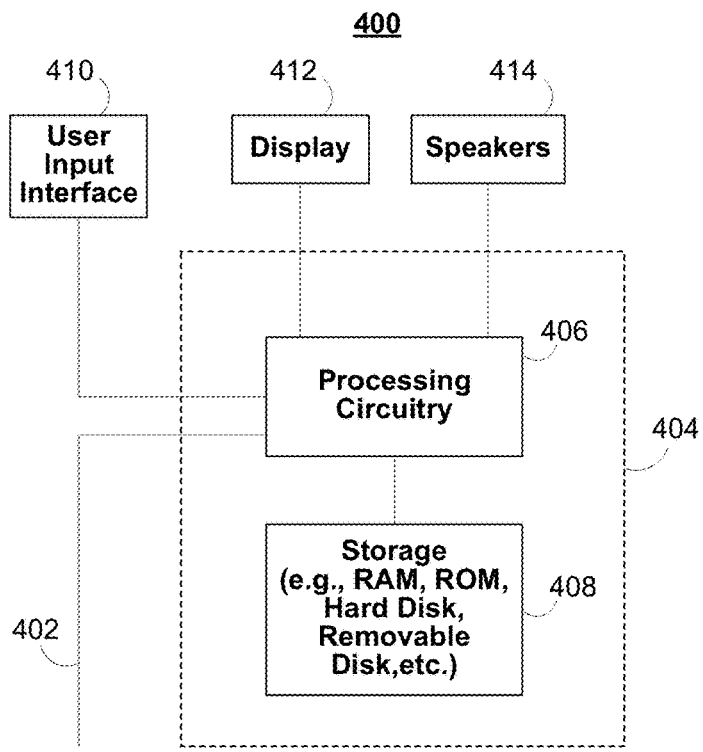
FIG. 4 shows a generalized embodiment of a stand-alone device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content.

The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
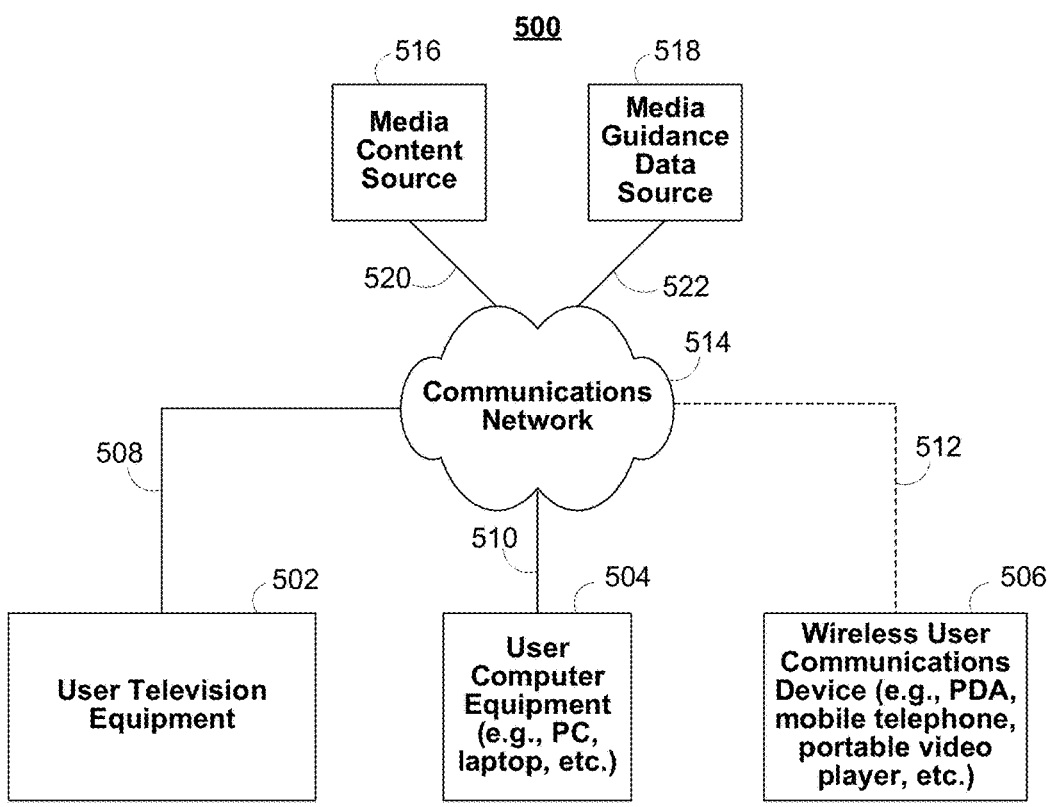
FIG. 5 shows a specific implementation of user devices in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 418, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE®, NETFLIX®, and HULU®, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition, or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
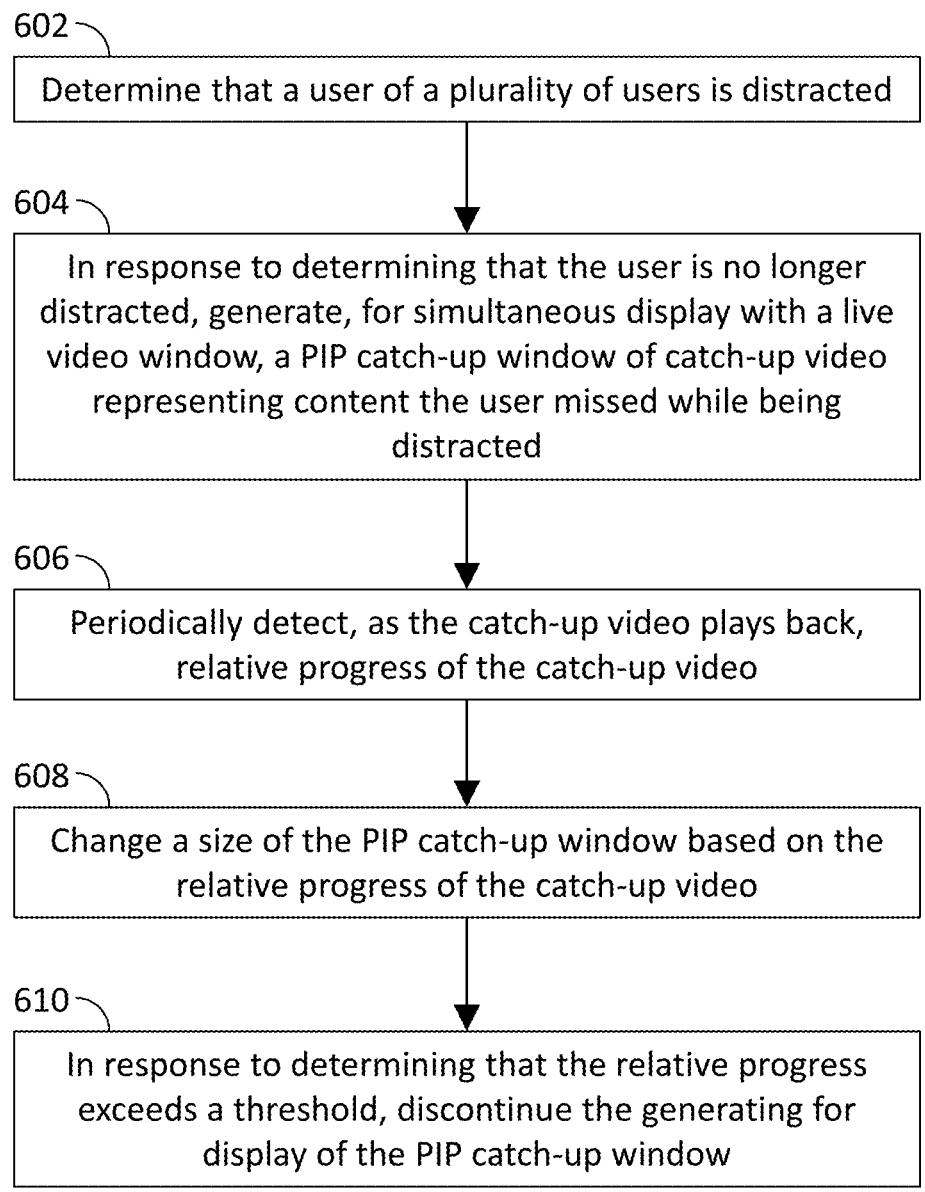
FIG. 6 is a flowchart representing a process for generating for display a PIP catch-up window in accordance with some embodiments of the disclosure.

The flowchart in FIG. 6 represents a process 600 implemented on control circuitry 404 for generating for display (e.g. on display 412) a PIP catch-up window (e.g., PIP window 102) according to an embodiment of the disclosure. It should be noted that process 600 or any action thereof could be performed on, or provided by, any of the devices shown in FIGS. 4-5. For example, process 600 may be executed by control circuitry 404 (FIG. 4) as instructed by a media guidance application implemented on a user device (e.g., user equipment devices 502, 504, and/or 506 (FIG. 5))

in order to generate for display a PIP catch-up window. In addition, one or more actions of process 600 may be incorporated into or combined with one or more actions of any other process or embodiment described herein.

A plurality of users may be viewing a live video together in the same room, or on the same user equipment (e.g., on user television equipment 502). At 602, control circuitry 404 determines whether a user of the plurality of users is distracted. This may be accomplished in several ways, as described below in relation to FIG. 11. If a user is determined to be distracted, control circuitry 404 begins recording of the live video for presentation as a catch-up video when the user is no longer distracted. The recorded video may be stored in a computer-readable storage medium such as storage 408. Additionally, or alternatively, the recorded video may be stored at a remote server (e.g., a server associated with media content source 516 and/or media guidance data source 518)

At 604, if control circuitry 404 determines that the user is no longer distracted, control circuitry 404 generates for simultaneous display with the live video (e.g., on display 412), a PIP catch-up window in which the catch-up video is played back. The content of the catch-up video includes the content of the live video that the user missed during the time that the user was distracted. Control circuitry 404 may continue to record the live video and append additional recorded video segments to the catch-up video stored (e.g., in storage 408) during playback of the catch-up video. Such recording and appending may continue until the user is completely caught up to the live video.

At 606, during playback of the catch-up video, control circuitry 404 periodically detects the relative progress of the catch-up video. For example, control circuitry 404 may evaluate the percentage of recorded catch-up video that has been played back. Alternatively, or additionally, control circuitry 404 may compare a time stamp of the current position of the catch-up video with a time stamp of the last video frame of the catch-up video, a time stamp of the live video, or the current system time.

At 608, control circuitry 404 changes the size of the PIP catch-up window based on the detected relative progress of the catch-up video. For example, the size of the PIP catch-up window may be reduced in proportion to the relative progress of the catch-up video.

Specifically, the control circuitry may execute instructions to generate for display the PIP catch-window (e.g., on display 412) in a smaller size.

At 610, in response to determining that the relative progress exceeds a certain threshold, control circuitry 404 discontinues generating the PIP catch-up window for display. For example, once the user has viewed 95 percent of the catch-up video, control circuitry 404 may stop generating for display the PIP catch-up window.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 6.

Figure 7:
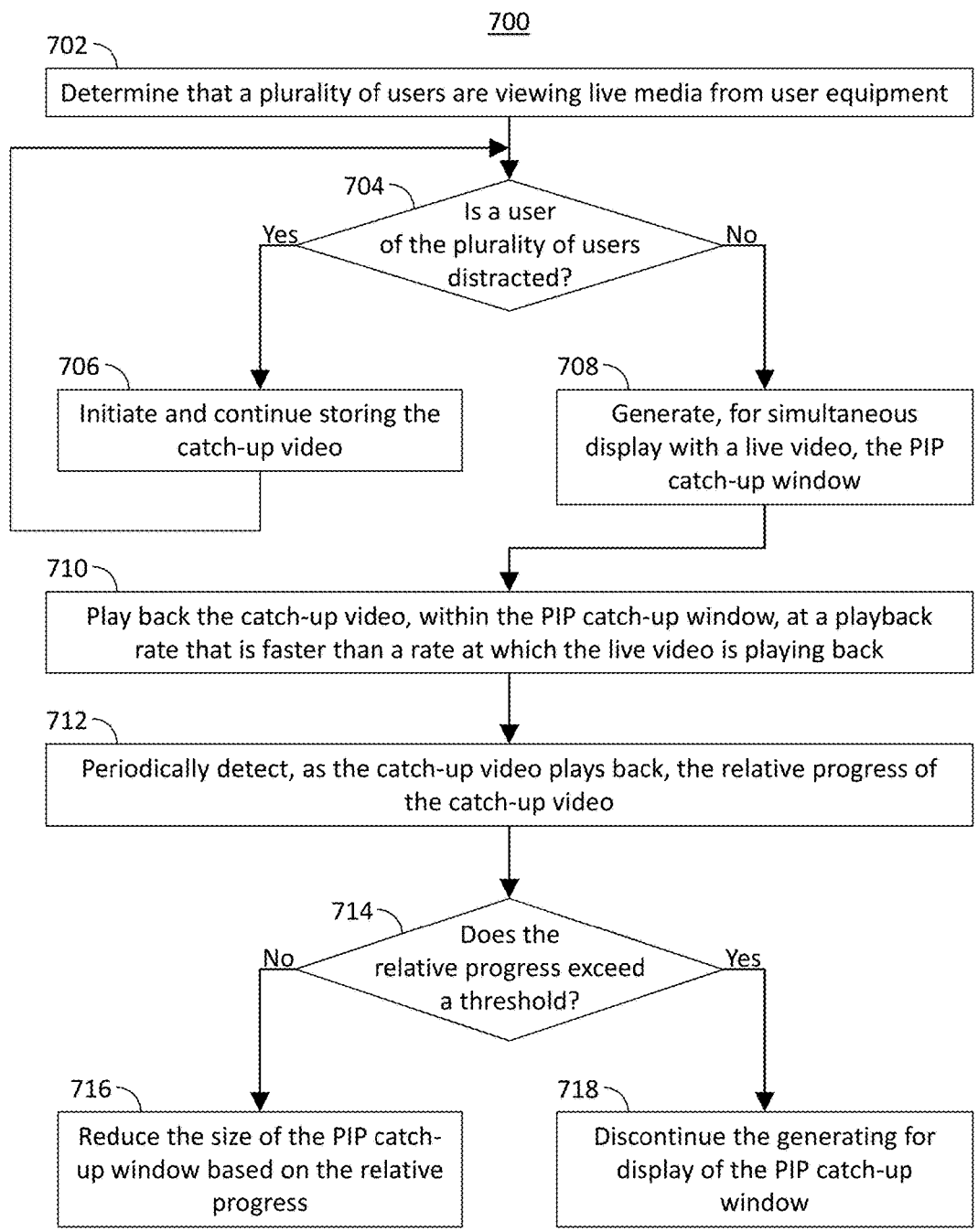
FIG. 7 is a flowchart representing another process for generating for display a PIP catch-up window in accordance with some embodiments of the disclosure.

The flowchart in FIG. 7 represents a process 700 implemented on control circuitry 404 for generating for display a PIP catch-up window according to an embodiment of the disclosure. It should be noted that process 700 or any action thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5)) in order to generate for display a PIP catch-up window. In addition, one or more actions of process 700 may be incorporated into or combined with one or more actions of any other process or embodiment described herein At 702, control circuitry 404 determines that a plurality of users is viewing live media from a user equipment. This may be accomplished in several ways. For example, user equipment (e.g., user television equipment 502) may include a camera, a motion sensor, an infrared proximity sensor, or any other sensor or module capable of detecting the presence of an individual or plurality of individuals in the area surrounding the user equipment 502. The camera or sensor module is coupled to the control circuitry 404. Control circuitry 404, using the camera or sensor module, may track each individual user viewing live media from the user equipment. Alternatively, control circuitry may, using the camera or sensor module, record images or videos of the area surrounding the user equipment at regular intervals.

At 704, control circuitry 404 determines whether any user of the plurality of users is distracted. This may be accomplished in several ways, as described below in relation to FIG. 11. Alternatively, control circuitry 404 may communicate, via communications network 514, the recorded images or videos to a remote server (e.g., media guidance data source 518) for processing. Control circuitry 404 may then receive, via communications network 514, a response indicating whether any user is determined to be distracted.

At 706, if a user is determined to be distracted, control circuitry 404 initiates and begins recording of a catch-up video. Control circuitry 404 may begin recording the live media stream as soon as a determination is made that a user is distracted, or after the user has been determined to be distracted for a certain amount of time (e.g., at least 5 seconds). The recorded media stream may be stored in storage 408. Control circuitry 404 then returns to action 704 to determine if the user is still distracted. Control circuitry may continue recording and storing the live media stream until the user is no longer distracted.

At 708, if the user is no longer distracted, control circuitry 404 generates for simultaneous display with the live media stream the PIP catch-up window. The PIP catch-up window is displayed as an overlay over the live media stream, as shown in FIG. 1.

At 710, control circuitry 404 plays back the catch-up video for display in the PIP catch-up window. Control circuitry 404 plays back the catch-up video at an increased rate relative to the rate at which the live video is played. This allows the user to catch-up to the live video at an accelerated pace, so as to minimize both the length of the catch-up video that must be recorded by control circuitry 404, and the length of time the user must spend watching the catch-up video before being able to return to watching the live video. The PIP catch-up window may initially be displayed at a predetermined maximum size.

Figure 8:
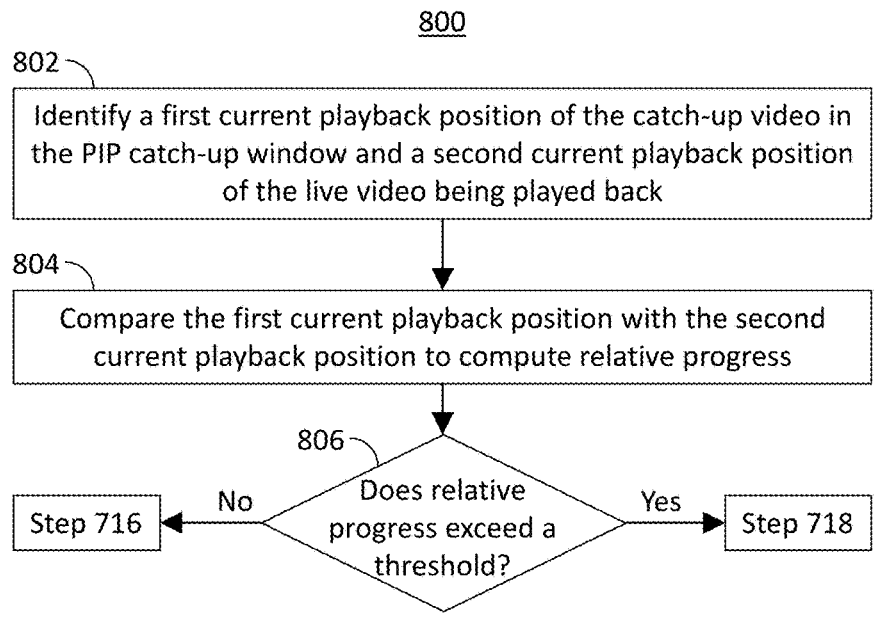
FIG. 8 is a flowchart representing a process for detecting the relative progress of a catch-up video in accordance with some embodiments of the disclosure.

At 712, during playback of the catch-up video, control circuitry 404 periodically detects the relative progress of the catch-video. Relative progress may be detected, for example, as shown in FIG. 8, by identifying the current playback position of the catch-up video in the PIP catch-up window and the current playback position of the live video (802), and comparing the current playback position of the catch-up video with that of the live video to compute the relative progress (804). The current playback positions may be the time at which the currently-displayed video frame was broadcast, the time the currently-displayed video frame was received, the time elapsed from the start of the program to the currently-displayed frame, or any other suitable metric for expressing the progress of a video. Alternatively, or additionally, relative progress may be detected by comparing the current playback position of the catch-up video with both the start position of the catch-up video and the length of the catch-up video. In another example, relative progress may be detected by comparing the length of catch-up video already played back with the total length of the recorded catch-up video, or the length of recorded catch-up video left to be played back. The relative progress may be expressed in units of time, or as a fraction or percentage of completion, or as a fraction or percentage remaining.

At 714, control circuitry 404 may compare the detected relative progress to a threshold value. For example, the relative progress of the catch-up video may be detected as being fifty-seven percent complete. Control circuitry 404 may determine the threshold value based on, for example, the overall length of the catch-up video. Control circuitry 404 may determine the threshold value to be at or near one hundred percent if the catch-up video is of a short duration, such as five minutes. For longer catch-up videos, for example, catch-up videos exceeding fifteen minutes in length, the media guidance application may determine a threshold value to be between ninety and ninety-five percent. Control circuitry 404 may compare the relative progress value with a threshold value of, for example, ninety-five percent. In this example, control circuitry 404 may determine that the relative progress does not exceed the ninety-five percent threshold value. In response to the detection, at 716, control circuitry 404 may reduce the size of the PIP catch-up window generated for display. For example, the size of the PIP catch-up window may be reduced by the relative progress percentage value. In other words, when the relative progress is fifty-seven percent, the size of the PIP catch-up window is reduced to fifty-seven percent of its original size. Other scaling may be used as well. For example, the PIP catch-up window may have a minimum size. The PIP catch-up window size may therefore be reduced by a percentage of the difference between the maximum and minimum sizes of the PIP catch-up window.

Once the relative progress has been detected as exceeding a particular threshold value, such as the ninety-five percent threshold value in the above example, control circuitry 404 may, at 718 discontinue generating for display the PIP catch-up window, as well as the recording of the catch-up video.

It is contemplated that the actions or descriptions of FIGS. 7-8 may be used with any other embodiment of this disclosure. In addition, the actions and descriptions described in relation to FIGS. 7-8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIGS. 7-8.

Figure 9:
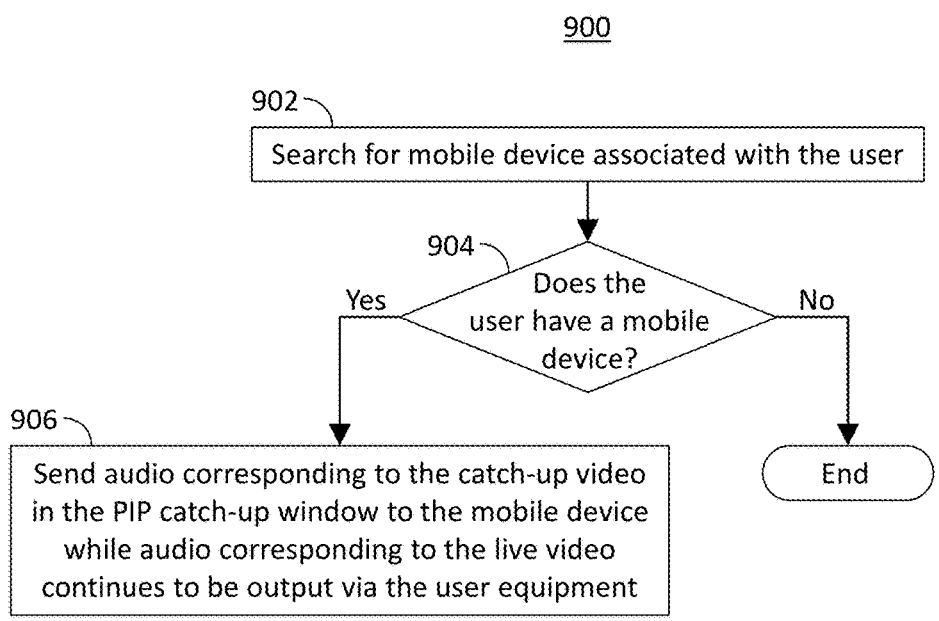
FIG. 9 is a flowchart representing a process for sending audio corresponding to a catch-up video to a mobile device in accordance with some embodiments of the disclosure.

The flowchart in FIG. 9 represents a process 900 implemented on control circuitry 404 for sending audio data corresponding to the PIP catch-up window to a mobile device according to an embodiment of the disclosure. It should be noted that process 900 or any action thereof could be performed on, or provided by, any of the devices shown in FIGS. 4-5. For example, process 900 may be executed by control circuitry 404 (FIG. 4) as instructed by a media guidance application implemented on a user device (e.g., user equipment devices 502, 504, and/or 506 (FIG. 5)) in order to send audio data corresponding to the PIP catch-up window to a mobile device. In addition, one or more actions of process 900 may be incorporated into or combined with one or more actions of any other process or embodiment described herein.

When generating for display the PIP catch-up window, the user viewing the catch-up video may wish to hear the audio corresponding to the catch-up video. However, playing two separate audio streams from the same device (e.g., speakers 414) simultaneously makes it difficult to understand either one. It may therefore be preferable to play the audio corresponding to the catch-up video from a separate device. In one exemplary embodiment, the audio corresponding to the catch-up video is sent to the user's mobile device so the that the user may listen privately to the audio corresponding to the catch-up video without disturbing the viewing experience of the other users. At 902, control circuitry 404 searches for a mobile device (e.g., wireless user communications device 506) associated with the user who was distracted. This may be accomplished in several ways. For example, each user may have a corresponding profile including their mobile device MAC addresses, or mobile telephone numbers. The profiles may be stored in a database, either locally (e.g., in storage 408) or on a remote server (e.g., media guidance data source 518). Alternatively, each user may have an application on their mobile device which links or pairs the mobile device with the user equipment (e.g., user television equipment 502).

At 904, control circuitry determines if a mobile device associated with the user is found. At 906, if a mobile device associated with the user has been identified, control circuitry 404 sends the audio corresponding to the catch-up video to the mobile device while continuing to generate for output, via speaker 414, audio corresponding to the live video from the user equipment.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 9.

Figure 10:
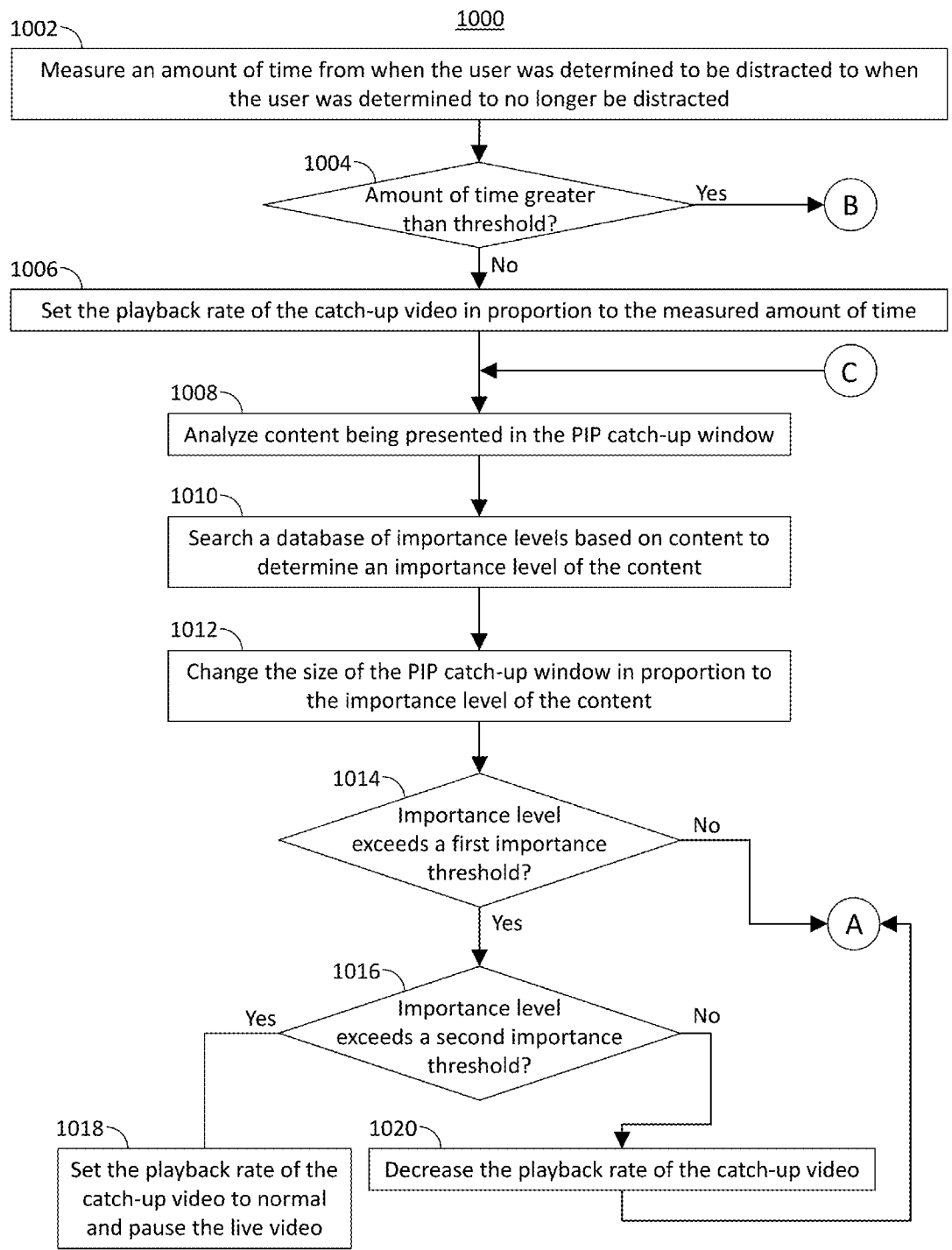
FIG. 10 is a flowchart representing a process for playing back a catch-up video, within a PIP catch-up window, at a playback rate faster than a rate at which the live video is playing back in accordance with some embodiments of the disclosure.
Figure 10:
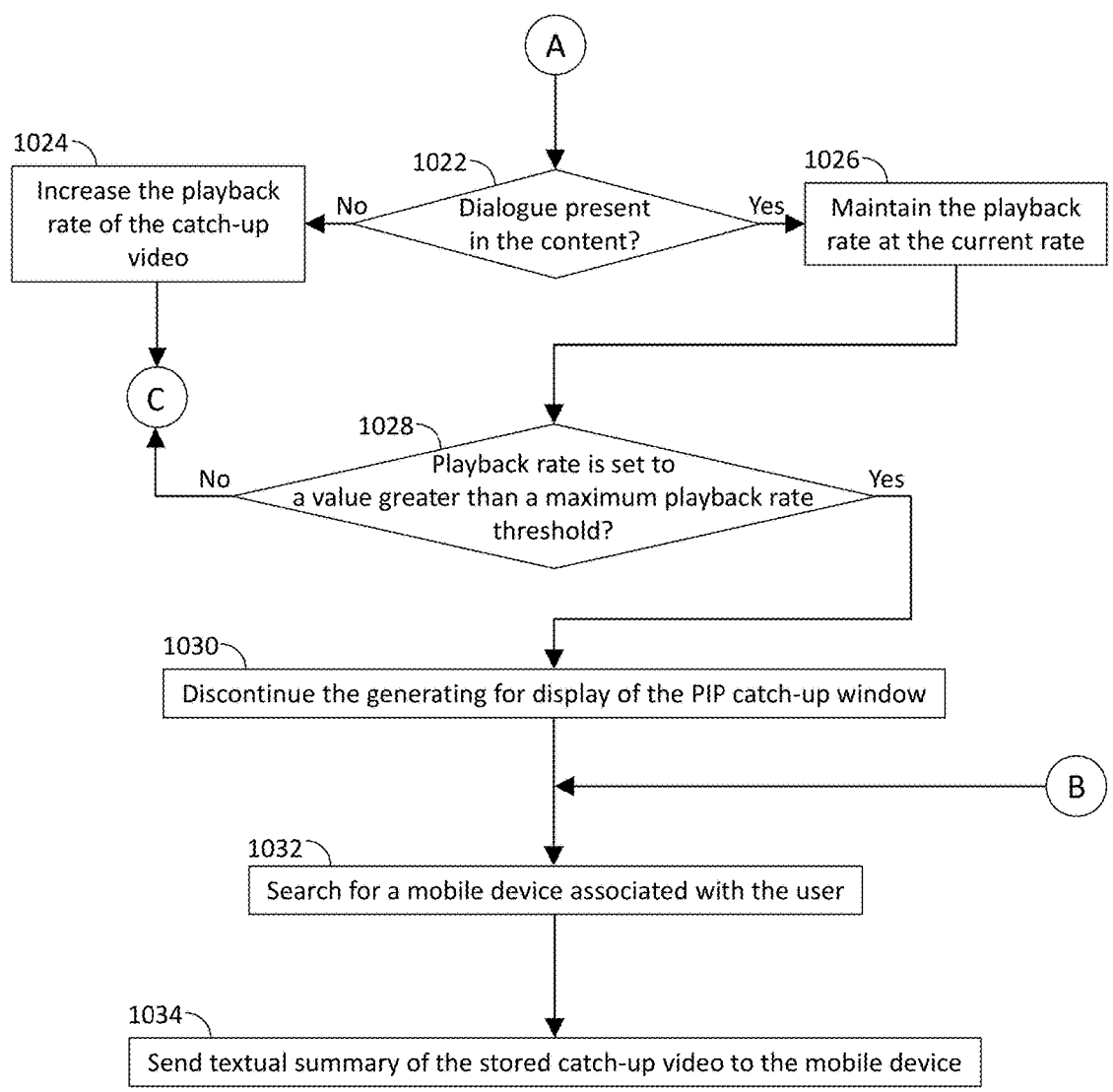

The flowchart in FIG. 10 represents a process 1000 implemented on control circuitry 404 for regulating the catch-up video according to an embodiment of the disclosure. It should be noted that process 1000 or any action thereof could be performed on, or provided by, any of the devices shown in FIGS. 4-5. For example, process 1000 may be executed by control circuitry 404 (FIG. 4) as instructed by a media guidance application implemented on a user device (e.g., user equipment devices 502, 504, and/or 506 (FIG. 5)) in order to manage user subscriptions to content sources. In addition, one or more actions of process 1000 may be incorporated into or combined with one or more actions of any other process or embodiment described herein.

At 1002, control circuitry 404 measures an amount of time from when the user was determined to be distracted to when the user was determined to no longer be distracted. Examples of how a user may be determined to be distracted or no longer distracted are discussed below in relation to FIG. 11. Control circuitry 404 may store (e.g., in storage 408) a time stamp indicating the time at which a user was first determined to be distracted. When the user is no longer distracted, the stored time stamp is compared to the current time to determine the amount of time the user was distracted.

At 1004, control circuitry 404 determines if the measured amount of time is greater than a certain threshold. For example, control circuitry 404 may determine if the measured amount of time is greater than 30 minutes.

At 1006, if the measured amount of time does not exceed the threshold, control circuitry 404 sets the playback rate of the catch-up video in proportion to the measured time. For example, the playback rate may be twice the normal rate if the measured time is 10 minutes, and may be three times the normal rate if the measured time is 15 minutes.

At 1008, control circuitry 404 analyzes the content being presented in the PIP catch-up window in order to determine the importance of the video segment being displayed therein. For example, control circuitry 404 may include an image recognition module, which may be implemented in software, firmware, or hardware. The image recognition module may be configured to identify the types of object in the segment being displayed in the PIP catch-up window. Control circuitry 404 may include a video processing module, implemented in software, firmware, or hardware, which may be configured to identify interactions between objects in a video segment. Control circuitry 404 may include an audio processing module, implemented in software, firmware, or hardware, which may be configured to identify audio elements of a media asset, such as dialogue, music, and sound effects. Based on the objects, interactions between those objects, audio elements, or any combination thereof in the video segment being displayed in the PIP catch-up window, control circuitry 404 may be configured to identify the type of content of the video segment.

At 1010, control circuitry 404 searches a database of importance levels based on the content of the video segment being displayed. The database may be stored locally in storage 408, or on a remote server such as media guidance data source 518. For example, in the catch-up video comprises a football game, as show in FIG. 1, a video segment showing a play resulting in a touchdown may have a higher importance than a play resulting in a first down. A play resulting in a first down may have a higher importance than an incomplete pass. A fumble may have a variable importance depending on whether there is a turn over as a result of the fumble. An interception may have a high importance similar to a touchdown.

At 1012, control circuitry 404 may change the size of the PIP catch-up window in proportion to the importance level. This may be in addition to, or instead of, the PIP catch-up window scaling described above in relation to FIG. 7.

At 1014, control circuitry 404 compares the importance level of the video segment currently being displayed in the PIP catch-up window with a first threshold importance level. If the importance of the video segment currently being displayed exceeds the first threshold importance level, and, at 1016, exceeds a second threshold importance level as well, then, at 1018, control circuitry 404 resets the playback rate of the catch-up video to the normal rate at which live video is presented, and pauses the live video. This may be because the even represented by the currently-displayed video segment in the PIP catch-up window is of such high importance that the user may not want to be distracted further by the live video while watching the particular segment of the catch-up video. At 1020, if the importance of the video segment currently being displayed in the PIP catch-up window exceeds the first threshold importance level, but not the second threshold importance level, control circuitry 404 may decrease the playback rate of the catch-up video.

After decreasing the playback rate at 1020, or if the importance level does not exceed the first threshold importance level at 1014, then, at 1022, control circuitry 404 determines if there is dialogue present in the audio corresponding to the video segment currently being displayed in the PIP catch-up window. At 1024, if no dialogue is present in the audio corresponding to the video segment currently being displayed in the PIP catch-up window, control circuitry 404 may increase the playback rate of the catch-up video. At 1026, if no dialogue is present in the audio corresponding to the video segment currently being displayed in the PIP window, control circuitry 404 may maintain the playback rate of the catch-up video at its current rate.

At 1028, control circuitry 404 may determine whether the playback rate is set to a value greater than a maximum playback rate threshold. If the playback rate is not greater than the maximum playback rate threshold, or after increasing the playback rate of the catch-up video at 1024, control circuitry 404 may return to 1008 and continue analyzing the content being presented in the PIP catch-up window.

At 1030, if the playback rate is determined to exceed a maximum playback rate threshold, control circuitry 404 may discontinue generating the PIP catch-up window for display. At 1032, in response to discontinuing generating the PIP catch-up window for display due to the playback rate being set to a value greater than a maximum playback rate threshold, or in response to the measured amount of time at 1002 being greater than a threshold amount of time at 1004, control circuitry 404 may search for a mobile device associated with the user. Methods of searching for a mobile device associated with the user are discussed above in relation to FIG. 9. Once a mobile device associated with the user has been found, control circuitry 404 may send a textual summary of the stored catch-up video to the mobile device via communications network 514. This summary may be sent via SMS, email, push notification, or any other communication protocol appropriate for transmitting text messages. Alternatively, a textual summary may be made available to the user from a remote server, and a link or other notification sent to the mobile device associated with the user.

In some embodiments, after discontinuing generating for display the PIP catch-up window, or determining that the measured amount of time exceeds the threshold amount of time, control circuitry 404 may save the recorded catch-up video in storage 408 for later viewing by the distracted user. The recorded catch-up video may be saved automatically, or control circuitry 404 may present to the user, through the interactive media guidance application, an option to save or discard the recorded catch-up video. Alternatively, the option to save or discard the recorded catch-up video may be presented to the user on the user's mobile device, either with the textual summary, or as a separate message or notification.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 10.

Figure 11:
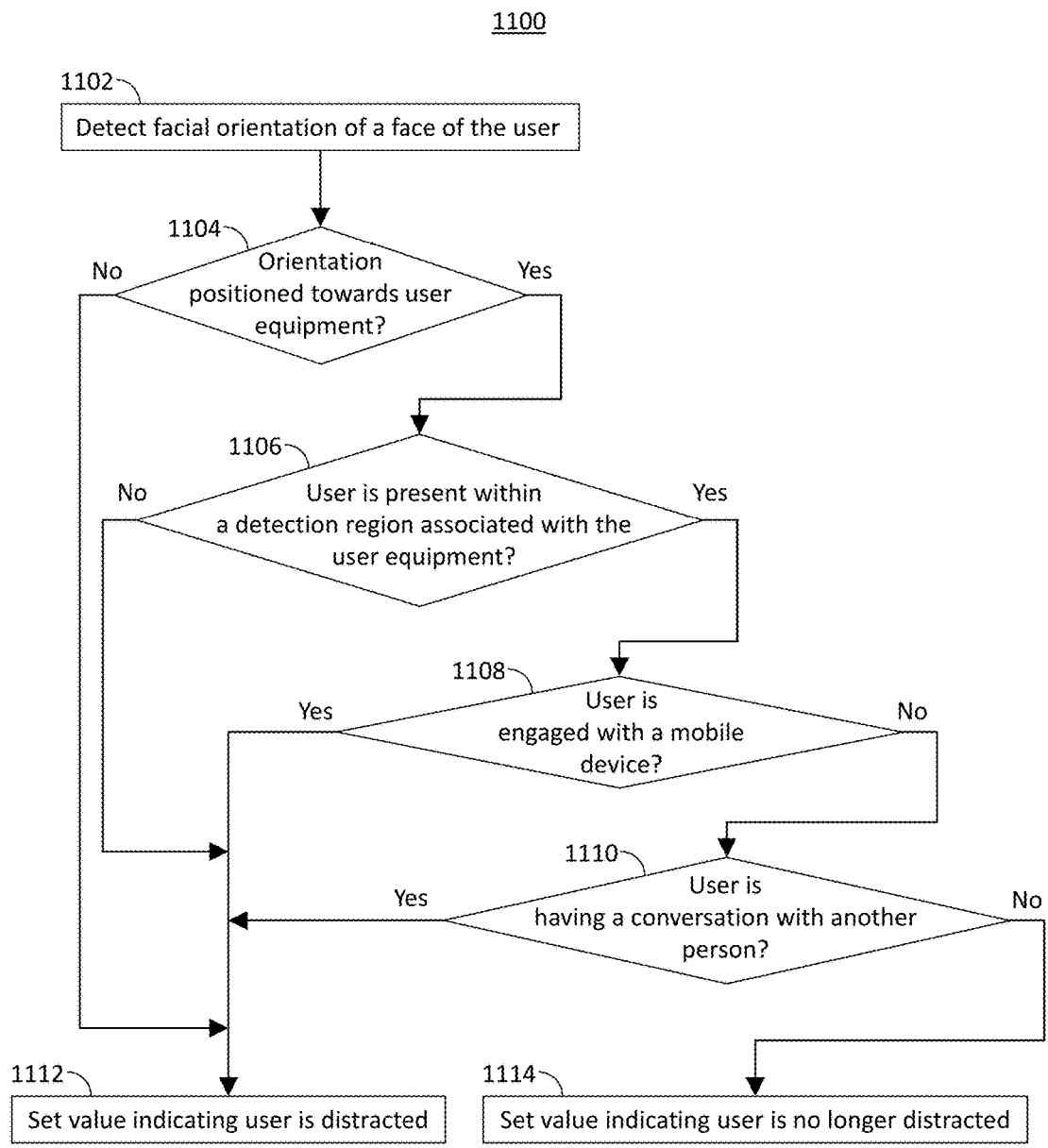
FIG. 11 is a flowchart representing a process for determining that a user of a plurality of users is distracted in accordance with some embodiments of the disclosure.

The flowchart in FIG. 11 represents a process 1100 for detecting whether a user is distracted or still distracted according to an embodiment of the disclosure. It should be noted that process 1100 or any action thereof could be performed on, or provided by, any of the devices shown in FIGS. 4-5. For example, process 1100 may be executed by control circuitry 404 (FIG. 4) as instructed by a media guidance application implemented on a user device (e.g., user equipment devices 502, 504, and/or 506 (FIG. 5)) in order to detect whether a user is distracted or still distracted. In addition, one or more actions of process 1100 may be incorporated into or combined with one or more actions of any other process or embodiment described herein.

The user equipment (e.g., user television equipment 502) may include a camera or other sensor module such as those listed above in relation to FIG. 7. The process described below is performed for each user viewing the live video on the user equipment (e.g., user television equipment 502). While a particular sequence of detections is described below, it is contemplated that these detections may occur in any order, or may occur in parallel. Additionally, the detections described below are exemplary, and other detections may be employed.

At 1102, control circuitry 404, using the camera or other sensor module, detects the facial orientation of a user viewing the live video from the user equipment. At 1104, the facial orientation of the user is analyzed. If the face of the user is oriented towards the user equipment, then the user may not be distracted, and additional detections may be performed. If the face of the user is not oriented toward the user equipment, then the user may be distracted. Control circuitry 404 may therefore, at 1112, set a value indicating that the user is distracted.

At 1106, control circuitry 404 determines if the user is within a detection region associated with the user equipment. For example, if a user is within a region of space close enough to the user equipment to be viewing the live video, that user is determined to be present within the detection region. If the user is within the detection region, then the user may not be distracted and additional detections may be performed. If the user is outside the detection region, then the user may be distracted. Control circuitry 404 may therefore, at 1112, set a value indicating that the user is distracted.

At 1108, control circuitry 404 determines whether the user is engaged with a mobile device. This may be accomplished using a camera or any other sensor module to analyze the posture and extremity positions of the user, by using the camera or other sensor module to explicitly detect a mobile device in the hands of the user, by using the camera or other sensor module to detect the eye orientation of the user, or a combination of the above. If the user is not engaged with a mobile device, then the user may not be distracted, and additional detections may be performed. If the user is not engaged with a mobile device, then the user may not be distracted, and additional detections may be performed. If the user is engaged with a mobile device, then the user may be distracted. Control circuitry 404 may therefore, at 1112, set a value indicating that the user is distracted.

At 1110, control circuitry 404 determines whether the user is having a conversation with another person. This may be accomplished using a camera or any other sensor module to analyzed the postures and/or facial movements of each user to determine if they are conversing with each other. If the user is determined not to be having a conversation with another person, then the user may not be distracted. If the user is determined to be having a conversation with another person, then the user may be distracted. Control circuitry 404 may therefore, at 1111, set a value indicating that the user is distracted.

At 1114, control circuitry 404 sets a value indicating that the user is no longer distracted. If the facial orientation of the user is not toward the user equipment at 1104, if the user is not present within the detection region at 1106, if the user is engaged with a mobile device at 1108, or if the user is having a conversation with another person at 1110, then, at 1112, control circuitry 404 may set a value indicating that the user is distracted. In some embodiments, control circuitry 404 may consider any combination of these factors to determine whether a user is no longer distracted.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 11.

Figure 12:
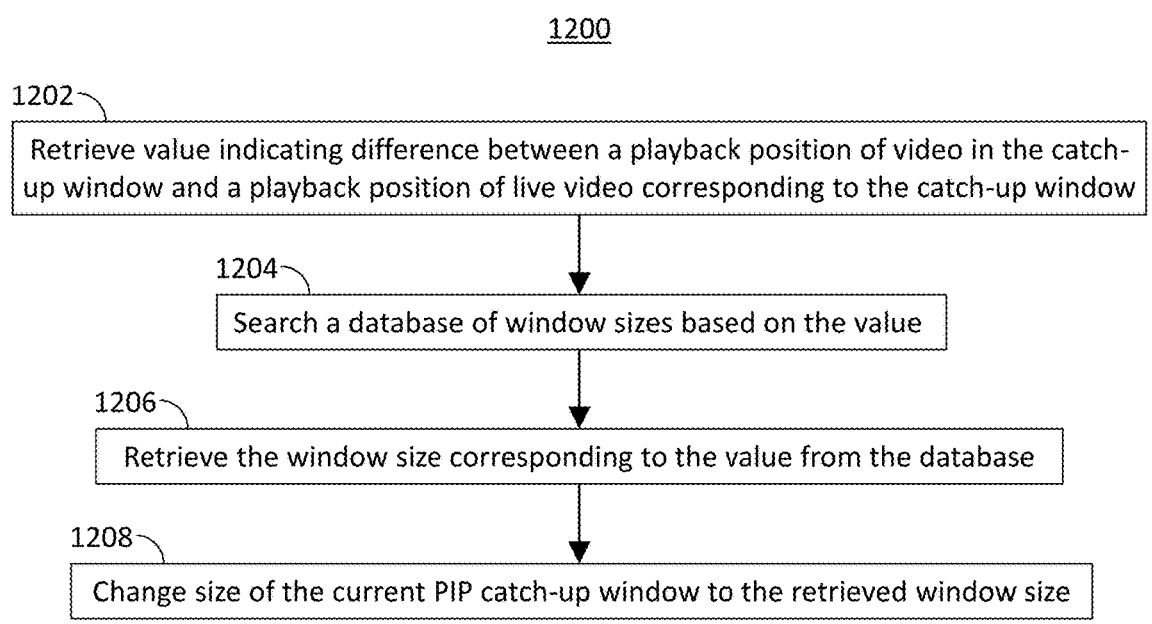
FIG. 12 is a flowchart representing a process for reducing the size of a PIP catch-up window based on the relative progress of the catch-up video in accordance with some embodiments of the disclosure.

The flowchart in FIG. 12 represents a process 1200 implemented on control circuitry 404 for changing the size of the PIP catch-up window according to an embodiment of the disclosure. It should be noted that process 1200 or any action thereof could be performed on, or provided by, any of the devices shown in FIGS. 4-5. For example, process 1200 may be executed by control circuitry 404 (FIG. 4) as instructed by a media guidance application implemented on a user device (e.g., user equipment devices 502, 504, and/or 506 (FIG. 5)) in order to change the size of the PIP catch-up window. In addition, one or more actions of process 1200 may be incorporated into or combined with one or more actions of any other process or embodiment described herein.

At 1202, control circuitry 404 retrieves a value indicating a difference between the playback position of the catch-up video and a playback position of the live video corresponding to the catch-up video. This process is similar to that described above in relation to FIG. 7, for determining the relative progress of the catch-up video, and similar methods may be applied here to determine the difference between the playback position of the catch-up video and the playback position of the live video.

At 1204, control circuitry 404 searches a database, stored locally in storage 408, or on a remote server (e.g., media guidance data source 518), of PIP catch-up window sizes based on the retrieved value. At 1206, control circuitry 404 retrieves a window size corresponding to the value from the database. The retrieved window size may be an absolute size, expressed in pixels or any other suitable unit of display area, or may be expressed as a relative value, such a as percentage of the maximum size of the PIP catch-up window, or a percentage of the difference between the maximum size and minimum size of the PIP catch-up window. At 1208, control circuitry 404 changes the size to the PIP catch-up window to the retrieved window size.

It is contemplated that the actions or descriptions of FIG. 12 may be used with any other embodiment of this disclosure. In addition, the actions and descriptions described in relation to FIG. 12 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 12.

More than one user may be detected as being distracted at the same time. For example, two users may be engaged in a conversation. When it is determined that they are no longer engaged in conversation, control circuitry 404 may send the audio corresponding to the catch-up video or a textual summary, as described above, to both users' mobile devices simultaneously.

In some cases, more than one user may be distracted at the same time, and may be detected as being distracted at different times, or may be detected as no longer distracted at different times. For example, a first user may be engaged with a mobile device at a first time and, while the first user is engaged with the mobile device, a second user leaves the detection area associated with the user equipment. Control circuitry 404 may record each distraction time separately so that the appropriate audio or textual summary may be sent to the appropriate user's mobile device. As another example, a first and second users may be engaged in conversation when the first user receives a phone call on their mobile device. The second user may be detected as no longer distracted, while the first user continues to be distracted. Control circuitry 404 may begin generating for display a PIP catch-up window for the second user to view, and send corresponding audio to the second user's mobile device. When the first user is no longer distracted, control circuitry 404 may generate for display a second PIP catch-up window for the first user to view, and send corresponding audio to the first user's mobile device. Alternatively, the first user may only receive a textual summary of the catch-up video if the display 412 is not large enough to display multiple PIP windows without compromising the viewing experience of other users watching the live video.

In some embodiments, if a user who was distracted and is viewing a catch-up video is detected as being distracted again while the catch-up video is in progress, control circuitry 404 may pause the catch-up video and continue appending video segments thereto. Control circuitry 404 may also pause the transmission of corresponding audio to the user's mobile device.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for re-integrating a picture-in-picture ("PIP") catch-up window with a live video window by reducing a size of the PIP catch-up window at a rate that is based on relative progress of catch-up video within the PIP catch-up window as compared to progress of live video within the live video window until the PIP catch-up window disappears, the method comprising:
   determining that a plurality of users is viewing live media from user equipment;
   determining that a user of the plurality of users is distracted;
   in response to determining that the user is distracted, initiating a storing of the catch-up video;
   determining that the user is no longer distracted;
   in response to determining that the user is no longer distracted:
   generating, for simultaneous display with the live video window, the PIP catch-up window, and
   playing back the catch-up video, within the PIP catch-up window, at a playback rate that is faster than a rate at which the live video is playing back;
   periodically detecting, as the catch-up video plays back, the relative progress of the catch-up video; and
   during each period in which the detecting occurs:
   determining whether the relative progress exceeds a threshold;
   in response to determining that the relative progress does not exceed the threshold, reducing the size of the PIP catch-up window based on the relative progress; and
   in response to determining that the relative progress exceeds the threshold, discontinuing the generating for display of the PIP catch-up window.

2. The method of claim 1, wherein detecting the relative progress comprises:
   identifying a first current playback position of the catch-up video in the PIP catch-up window;
   identifying a second current playback position of the live video being played back; and
   comparing the first current playback position with the second current playback position to compute the relative progress.

3. The method of claim 1 further comprising:
   searching for a mobile device associated with the user; and
   sending audio corresponding to the catch-up video in the PIP catch-up window to the mobile device while audio corresponding to the live video continues to be output via the user equipment.

4. The method of claim 1 further comprising:
   analyzing content being presented in the PIP catch-up window;
   searching a database of importance levels based on the content to determine an importance level of the content; and in response to determining that the importance level exceeds a first importance threshold, decreasing the playback rate of the catch-up video.

5. The method of claim 4 further comprising, in response to determining that the importance level exceeds a second importance threshold greater than the first importance threshold, playing back the catch-up video at a playback rate equal to the playback rate of the live video, and pausing the live video.

6. The method of claim 1 further comprising:
measuring an amount of time from when the user was determined to be distracted to when the user was determined to no longer be distracted; and
setting the playback rate of the catch-up video in proportion to the measured amount of time.

7. The method of claim 6 further comprising in response to determining that the playback rate is set to a value greater than a maximum playback rate threshold:
discontinuing the generating for display of the PIP catch-up window;
searching for a mobile device associated with the user; and
sending a textual summary of the stored catch-up video to the mobile device.

8. The method of claim 6 further comprising in response to determining that the amount of time is greater than a threshold:
discontinuing the generating for display of the PIP catch-up window;
searching for a mobile device associated with the user; and
sending a textual summary of the stored catch-up video to the mobile device.

9. The method of claim 1 further comprising:
analyzing content being presented in the PIP catch-up window;
detecting whether dialogue is present in the content; and
in response to detecting that dialogue is not present in the content, increasing the playback rate of the catch-up video.

10. The method of claim 1 further comprising:
analyzing content being presented in the PIP catch-up window;
searching a database of importance levels based on the content to determine an importance level of the content; and
changing the size of the PIP catch-up window in proportion to the importance level of the content.

11. A system for re-integrating a picture-in-picture ("PIP") catch-up window with a live video window by reducing a size of the PIP catch-up window at a rate that is based on relative progress of catch-up video within the PIP catch-up window as compared to progress of live video within the live video window until the PIP catch-up window disappears, the system comprising:
control circuitry configured to:
determine that a plurality of users is viewing live media from user equipment;
determine that a user of the plurality of users is distracted;
in response to determining that the user is distracted, initiate storing of the catch-up video;
determine that the user is no longer distracted;
in response to determining that the user is no longer distracted:
generate, for simultaneous display with the live video window, the PIP catch-up window, and play back the catch-up video, within the PIP catch-up window, at a playback rate that is faster than a rate at which the live video is playing back;
periodically detect, as the catch-up video plays back, the relative progress of the catch-up video; and
during each period in which the detecting occurs:
determine whether the relative progress exceeds a threshold;
in response to determining that the relative progress does not exceed the threshold, reduce the size of the PIP catch-up window based on the relative progress; and
in response to determining that the relative progress exceeds the threshold, discontinue the generating for display of the PIP catch-up window.

12. The system of claim 11, wherein the control circuitry is further configured, when detecting the relative progress, to:
identify a first current playback position of the catch-up video in the PIP catch-up window;
identify a second current playback position of the live video being played back; and
compare the first current playback position with the second current playback position to compute the relative progress.

13. The system of claim 11, wherein the control circuitry is further configured to:
search for a mobile device associated with the user; and
send audio corresponding to the catch-up video in the PIP catch-up window to the mobile device while audio corresponding to the live video continues to be output via the user equipment.

14. The system of claim 11, wherein the control circuitry is further configured to:
analyze content being presented in the PIP catch-up window;
search a database of importance levels based on the content to determine an importance level of the content; and
in response to determining that the importance level exceeds a first importance threshold, decrease the playback rate of the catch-up video.

15. The system of claim 14, wherein the control circuitry is further configured to, in response to determining that the importance level exceeds a second importance threshold greater than the first importance threshold, play back the catch-up video at a playback rate equal to the playback rate of the live video, and pause the live video.

16. The system of claim 11, wherein the control circuitry is further configured to:
measure an amount of time from when the user was determined to be distracted to when the user was determined to no longer be distracted; and
set the playback rate of the catch-up video in proportion to the measured amount of time.

17. The system of claim 16, wherein the control circuitry is further configured to, in response to determining that the playback rate is set to a value greater than a maximum playback rate threshold:
discontinue the generating for display of the PIP catch-up window;
search for a mobile device associated with the user; and
send a textual summary of the stored catch-up video to the mobile device.

18. The system of claim 16, wherein the control circuitry is further configured to, in response to determining that the amount of time is greater than a threshold:

discontinue the generating for display of the PIP catch-up window;
search for a mobile device associated with the user; and
send a textual summary of the stored catch-up video to the mobile device.

19. The system of claim 11, wherein the control circuitry is further configured to:
analyze content being presented in the PIP catch-up window;
detect whether dialogue is present in the content; and
in response to detecting that dialogue is not present in the content, increase the playback rate of the catch-up video.

20. The system of claim 11, wherein the control circuitry is further configured to:
analyze content being presented in the PIP catch-up window;
search a database of importance levels based on the content to determine an importance level of the content; and
change the size of the PIP catch-up window in proportion to the importance level of the content.

* * * * *